United States Patent
Zhu et al.

(10) Patent No.: US 10,863,523 B2
(45) Date of Patent: Dec. 8, 2020

(54) METHOD FOR INSTRUCTING A USER TERMINAL TO PERFORM MEASUREMENT AND DATA INTERACTION AT A COMMUNICATION RESOURCE LOCATION OUTSIDE OF RESERVED FREQUENCY DOMAIN RESOURCE RANGE, BASE STATION, USER TERMINAL, AND COMPUTER-READABLE STORAGE MEDIUM

(71) Applicant: Yulong Computer Telecommunication Scientific (Shenzhen) Co., Ltd., Guangdong (CN)

(72) Inventors: Yajun Zhu, Guangdong (CN); Mingju Li, Guangdong (CN); Yunfei Zhang, Guangdong (CN)

(73) Assignee: Yulong Computer Telecommunication Scientific (Shenzhen) Co., Ltd., Shenzhen (CN)

(*) Notice: Subject to any disclaimer, the term of this patent is extended or adjusted under 35 U.S.C. 154(b) by 0 days.

(21) Appl. No.: 16/322,414

(22) PCT Filed: Jul. 31, 2016

(86) PCT No.: PCT/CN2016/092534
§ 371 (c)(1),
(2) Date: Jan. 31, 2019

(87) PCT Pub. No.: WO2018/123223
PCT Pub. Date: Feb. 8, 2018

(65) Prior Publication Data
US 2019/0200367 A1    Jun. 27, 2019

(51) Int. Cl.
*H04W 72/08* (2009.01)
*H04W 24/08* (2009.01)
*H04W 24/10* (2009.01)

(52) U.S. Cl.
CPC ......... *H04W 72/085* (2013.01); *H04W 24/08* (2013.01); *H04W 24/10* (2013.01)

(58) Field of Classification Search
CPC ... H04W 72/044; H04W 72/085; H04W 4/40; H04W 24/10; H04W 24/08
See application file for complete search history.

(56) References Cited

U.S. PATENT DOCUMENTS

| | | | | |
|---|---|---|---|---|
| 2014/0036859 | A1* | 2/2014 | Ekpenyong | H04W 72/042 370/330 |
| 2016/0205666 | A1* | 7/2016 | Huschke | H04W 72/04 370/330 |
| 2019/0124633 | A1* | 4/2019 | Hang | H04L 5/0094 |

FOREIGN PATENT DOCUMENTS

| | | |
|---|---|---|
| CN | 101686502 A | 3/2010 |
| CN | 101998576 A | 3/2011 |

(Continued)

OTHER PUBLICATIONS

International Search Report and Written Opinion for International Application No. PCT/CN2016/092534, dated Apr. 24, 2017.

(Continued)

*Primary Examiner* — Wei Zhao
(74) *Attorney, Agent, or Firm* — Wolf, Greenfield & Sacks, P.C.

(57) ABSTRACT

Provided are a method and a device for information transmission. The method comprises: determining, by a base station, communication resource indication information corresponding to a user terminal according to a reserved frequency domain resource range, where the user terminal is located within a service range of the base station; sending, by the base station, the corresponding communication resource indication information to the user terminal to enable the user terminal to perform measurement and data interaction on a communication resource location deter- (Continued)

A base station determines communication resource indication information corresponding to a user terminal according to a reserved frequency domain resource range, where the user terminal is located within a service range of the base station — 110

The base station sends the corresponding communication resource indication information to the user terminal to enable the user terminal to perform measurement and data interaction on a communication resource location determined according to the communication resource indication information — 120 mined by the communication resource indication information, where the communication resource location is not within the reserved frequency domain resource range.

20 Claims, 14 Drawing Sheets

(56) References Cited

FOREIGN PATENT DOCUMENTS

| | | |
|---|---|---|
| CN | 102014444 A | 4/2011 |
| CN | 102076056 A | 5/2011 |
| WO | WO 2007/131558 A1 | 11/2007 |

OTHER PUBLICATIONS

International Preliminary Report on Patentability for International Application No. PCT/CN2016/092534, dated Feb. 14, 2019.

* cited by examiner

METHOD FOR INSTRUCTING A USER TERMINAL TO PERFORM MEASUREMENT AND DATA INTERACTION AT A COMMUNICATION RESOURCE LOCATION OUTSIDE OF RESERVED FREQUENCY DOMAIN RESOURCE RANGE, BASE STATION, USER TERMINAL, AND COMPUTER-READABLE STORAGE MEDIUM

CROSS REFERENCE TO RELATED APPLICATION

This is a national stage filing under 35 U.S.C. § 371 of international patent application no. PCT/CN2016/092534, filed on Jul. 31, 2016, the entire contents of which is incorporated herein by reference in its entirety.

TECHNICAL FIELD

The present disclosure relates to the field of communications and, in particular, to a method and a device for information transmission.

BACKGROUND

With the rapid development of mobile services, the current wireless communication technologies such as the 4-th generation mobile communication technology characterized by orthogonal frequency division multiplexing (OFDM) cannot meet requirements of new scenarios. Researches on the 5-th generation communication technology have been carried out in academia and industry. However, the research and standardization of a new generation of wireless communication technologies require a long period of evolution to adapt to different scenarios. Therefore, in an initial stage of standardization, how to ensure that a current standardized technical solution will not hinder a design of possible technical solutions in the follow-up evolution process is a problem to be focused on. That is, forward compatibility needs considering in the current standardization process.

The forward compatibility has been considered in a design of a previous Long Term Evolution (LTE) system. For example, in a subframe design in LTE Release 8 (Rel-8), a Multimedia Broadcast multicast service Single Frequency Network (MBSFN) subframe is introduced, and the MBSFN subframe does not have system information or important access-related information. A conventional terminal only needs to detect a physical downlink control channel (PDCCH), a physical control format indicator channel (PCFICH) or a physical hybrid ARQ indicator channel (PHICH) on the first two OFDM symbols. Therefore, a new technology may be introduced on another position of the MBSFN subframe without affecting operations of the terminal in the LTE Rel-8. For example, a transmission mode based on a demodulation reference signal (DMRS) which is introduced in the subsequent LTE evolution process may be transmitted on the MBSFN subframe.

However, with continuous technology development, a conventional system design method for the forward compatibility cannot well support an introduction of a new function.

SUMMARY

The present disclosure provides a method and a device for information transmission to optimize an existing system design technology for forward compatibility and support an introduction of a new function in a subsequent evolution process.

In a first aspect, an embodiment of the present disclosure provides a method for information transmission including the steps described below.

A base station determines communication resource indication information corresponding to a user terminal according to a reserved frequency domain resource range, where the user terminal is located within a service range of the base station.

The base station sends the corresponding communication resource indication information to the user terminal to enable the user terminal to perform measurement and data interaction at a communication resource location determined according to the communication resource indication information.

The communication resource location is not within the reserved frequency domain resource range.

In a second aspect, an embodiment of the present disclosure provides a method for information transmission including the steps described below.

A user terminal receives communication resource indication information sent by a base station, where the communication resource indication information is determined by the base station according to a reserved frequency domain resource range, and the user terminal is located within a service range of the base station.

The user terminal determines a communication resource location according to the communication resource indication information, where the communication resource location is not within the reserved frequency domain resource range.

The user terminal performs measurement and data interaction at the communication resource location.

In a third aspect, an embodiment of the present disclosure provides a device for information transmission, disposed in a base station. The device includes the modules described below.

A communication resource indication information determining module is configured to determine communication resource indication information corresponding to a user terminal according to a reserved frequency domain resource range, where the user terminal is located within a service range of the base station.

A communication resource indication information sending module is configured to send the corresponding communication resource indication information to the user terminal to enable the user terminal to perform measurement and data interaction on a communication resource location determined according to the communication resource indication information.

The communication resource location is not within the reserved frequency domain resource range.

In a fourth aspect, an embodiment of the present disclosure provides a device for information transmission, disposed in a user terminal. The device includes the modules described below.

A communication resource indication information receiving module is configured to receive communication resource indication information sent by a base station, where the communication resource indication information is determined by the base station according to a reserved frequency domain resource range, and the user terminal is located within a service range of the base station.

A communication resource location determining module is configured to determine a communication resource location according to the communication resource indication information, where the communication resource location is not within the reserved frequency domain resource range.

A measurement and data interaction module is configured to perform measurement and data interaction at the communication resource location.

In a fifth aspect, an embodiment of the present disclosure further provides a non-transient computer-readable storage medium configured in a user terminal. The storage medium stores computer-executable instructions for executing any of the methods for information transmission.

In a sixth aspect, an embodiment of the present disclosure further provides a non-transient computer-readable storage medium configured in a base station. The storage medium stores computer-executable instructions for executing any of the methods for information transmission.

DETAILED DESCRIPTION

To obtain a clearer understanding of objects, features and advantages of the present disclosure, a description of the present disclosure will be given below in conjunction with the drawings and embodiments. It is to be noted that if not in collision, the embodiments and features therein in the present disclosure may be combined with each other.

Details are set forth below to facilitate a thorough understanding of the present disclosure. However, the present disclosure may be implemented by other embodiments different from the embodiments described herein. Therefore, the scope of the present disclosure is not limited by the embodiments described below.

Embodiment 1

Figure 1:
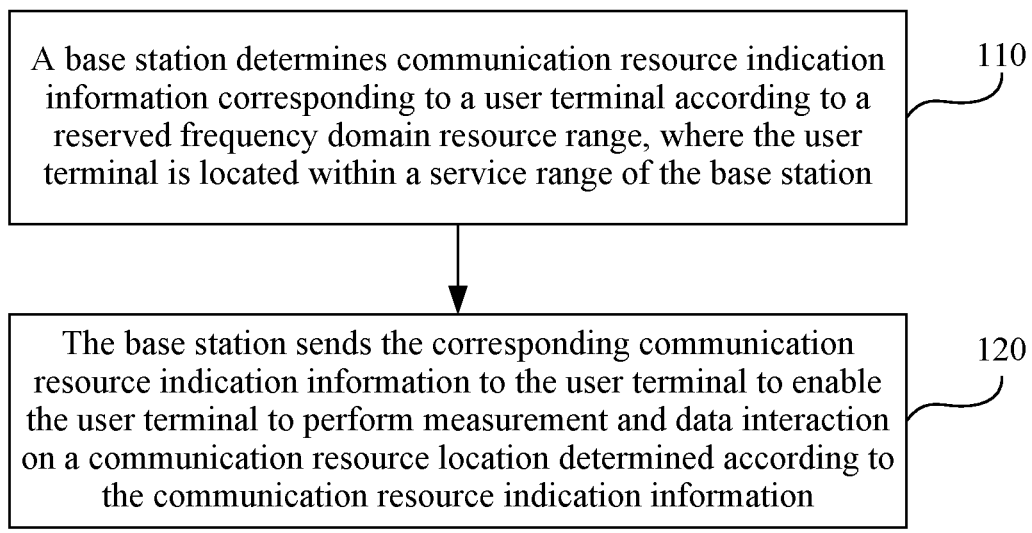
FIG. 1 is a flowchart of a method for information transmission according to an embodiment 1 of the present disclosure.

FIG. 1 is a flowchart of a method for information transmission according to an embodiment 1 of the present disclosure. The method in this embodiment may be executed by a device for information transmission. The device may be implemented by hardware and/or software and generally integrated in a base station for working together with a user terminal. The method in this embodiment includes the steps described below.

In 110, a base station determines communication resource indication information corresponding to a user terminal according to a reserved frequency domain resource range, where the user terminal is located within a service range of the base station.

In this embodiment, a frequency domain resource is reserved to guarantee forward compatibility. Firstly, the base station determines a frequency domain resource range that needs to be reserved.

The frequency domain resource range may be preset according to practical conditions. Typically, the frequency domain resource range may be selected according to characteristics of a new function to be introduced.

In this embodiment, optionally, the communication resource indication information refers to information indicating an available or unavailable communication resource for the user terminal.

Accordingly, the communication resource indication information may optionally include reserved resource information or available resource information.

The reserved resource information is configured for indicating that the user terminal performs measurement and data interaction on a communication resource location excluding the reserved resource information.

The available resource information is configured for indicating that the user terminal performs the measurement and the data interaction at the communication resource location corresponding to the available resource information.

It is to be understood that the reserved resource information corresponds to the reserved frequency domain resource range and the available resource information corresponds to a frequency domain resource obtained by excluding the reserved frequency domain resource range from frequency domain resources allocable by the base station.

In an example, if the base station determines that the reserved frequency domain resource range is [f1, f2], [f1, f2] may be directly taken as the reserved resource information. In addition, the base station may further configure the available resource information corresponding to each user terminal according to the reserved frequency domain resource range and the number of terminals within the service range (such as a terminal 1 and a terminal 2) of the base station to ensure that the available resource information corresponding to each user terminal does not overlap the reserved frequency domain resource range. For example, the available resource information corresponding to the terminal 1 may be [f0, f1), and the available resource information corresponding to the terminal 2 may be (f2, f3].

If at least two user terminals are located within the service range of the base station, the communication resource indication information corresponding to the at least two user terminals determined by the base station is the same or different.

If the communication resource indication information sent by the base station to the at least two user terminals is the available resource information, the available resource information sent by the base station to each user terminal may be the same.

That is, the available resource information corresponding to the terminal 1 and the available resource information corresponding to the terminal 2 may both be [f0, f1).

In 120, the base station sends the corresponding communication resource indication information to the user terminal to enable the user terminal to perform the measurement and the data interaction at the communication resource location determined according to the communication resource indication information. The communication resource location is not within the reserved frequency domain resource range.

In this embodiment, after a communication connection is established between the base station and the user terminal, the base station may send the corresponding communication resource indication information in signaling interaction with the user terminal.

Optionally, the base station may send the corresponding communication resource indication information to the user terminal via radio resource control (RRC) signaling. The base station may further send the corresponding communication resource indication information to the user terminal via media access control layer signaling. Alternatively, the base station may further send the corresponding communication resource indication information to the user terminal via physical layer signaling.

It should be understood by those skilled in the art that the base station may send the communication resource indication information in any signaling interaction process to the user terminal within the service range of the base station, which is not limited in this embodiment.

As described above, after receiving the communication resource indication information, the user terminal within the service range of the base station performs the measurement and the data interaction at the communication resource location defined by the communication resource indication information. That is, after receiving the reserved resource information, the user terminal performs the measurement and the data interaction at the communication resource location excluding the reserved resource information. After receiving the available resource information, the user terminal only performs the measurement and the data interaction at the communication resource location corresponding to the available resource information. No operation is performed on the remaining communication resource location so that a technical effect that the communication resource location configured by the user terminal is not within the frequency domain resource range reserved by the base station is achieved, thereby achieving the reservation of a frequency domain resource.

The measurement means that the base station sends measurement configuration information including a pilot pattern to the user terminal, and the user terminal performs measurement according to the pilot pattern and measurement configuration requirements and reports a measurement report to the base station under a certain condition. The data interaction refers to a data transceiving process between the user terminal and the base station after the user terminal is successfully attached to the base station.

In the embodiments of the present disclosure, the base station determines the communication resource indication information corresponding to the user terminal according to the reserved frequency domain resource range and sends the corresponding communication resource indication information to the user terminal so that the user terminal performs the measurement and the data interaction on the resource location that is not within the frequency domain resource range reserved by the base station. In this way, a purpose of reserving a set frequency domain resource is achieved and a new function may be further introduced in the reserved frequency domain resource, thereby effectively ensuring design requirements of forward compatibility, overcoming a limitation of an existing system design for the forward compatibility in the time dimension, and satisfying increasing personalized and convenient design requirements of the forward compatibility.

In an optional implementation mode of this embodiment, the communication resource indication information may be the available resource information. Given that the user terminal performs a measurement operation and a data interaction operation at the communication resource location determined according to the available resource information, the available resource information may be available resource information for two resource locations configured for performing the measurement and the data interaction separately; or available resource information for one resource location configured for performing the measurement and the data interaction alternately or simultaneously.

The available resource information for two resource locations includes: available resource information for two resource locations with no overlap, available resource information for two resource locations with a partial overlap or available resource information for two resource locations with an inclusion relation.

Figure 2A:
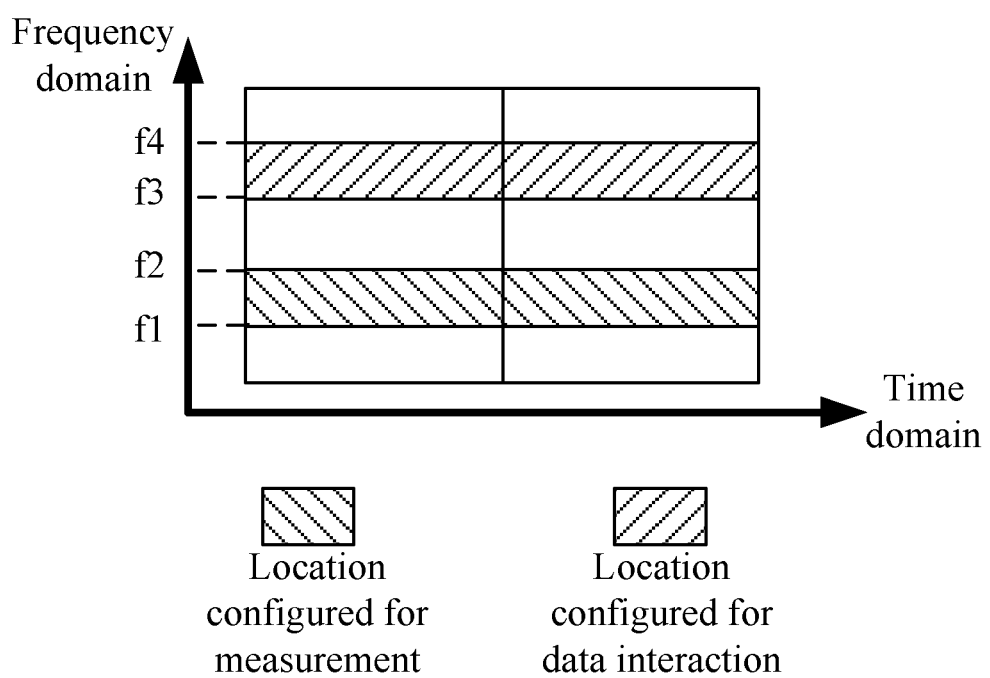
FIG. 2A is a schematic diagram in frequency-time domains of two frequency domain resource locations with no overlap and being specified by a base station according to the embodiment 1 of the present disclosure.

FIG. 2A is a schematic diagram in frequency-time domain of two frequency domain resource locations with no overlap and being specified by the base station. The base station specifies the frequency domain resource [f1, f2] to be configured for the measurement and the frequency domain resource [f3, f4] to be configured for the data interaction in the transmitted available resource information. After the user terminal receives the available resource information, the user terminal performs the measurement using the frequency domain resource [f1, f2] and performs the data interaction using the frequency domain resource [f3, f4] in a subsequent communication process.

Figure 2B:
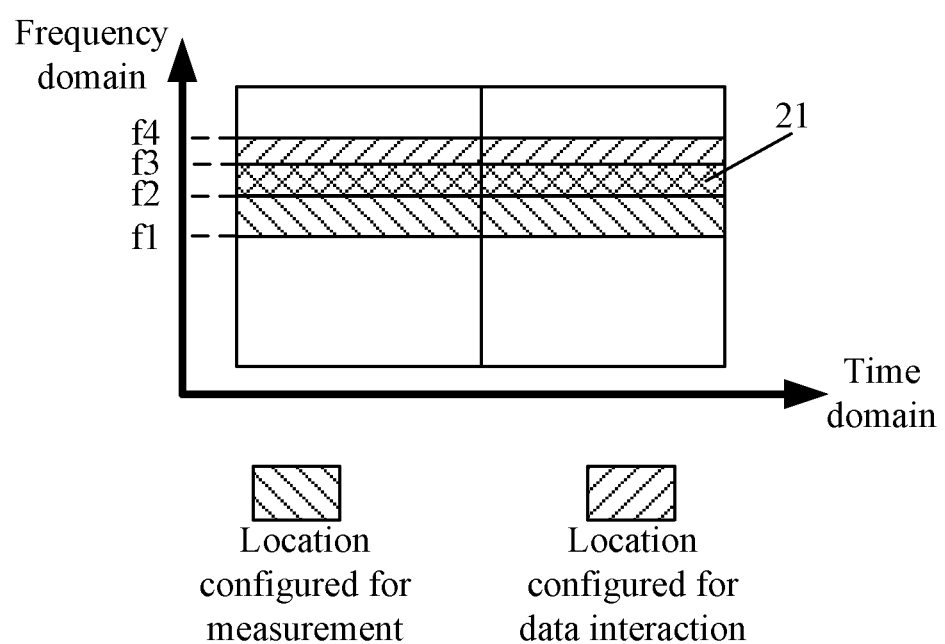
FIG. 2B is a schematic diagram in frequency-time domain of two frequency domain resource locations with a partial overlap and being specified by the base station according to the embodiment 1 of the present disclosure.

FIG. 2B is a schematic diagram in frequency-time domain of two frequency domain resource locations with a partial overlap and being specified by the base station. The base station specifies the frequency domain resource [f1, f3] to be configured for the measurement and the frequency domain resource [f2, f4] to be configured for the data interaction in the transmitted available resource information. After the user terminal receives the available resource information, the user terminal performs the measurement using the frequency domain resource [f1, f3] and performs the data interaction using the frequency domain resource [f2, f4] in the subsequent communication process. The frequency domain resource configured for the measurement and the frequency domain resource configured for the data interaction have an overlap 21 (the overlap 21 corresponds to [f2, f3]) which may be configured for performing the measurement and the data interaction alternately or simultaneously. The overlap 21 may be configured in a manner of being scheduled by the base station in a practical application process.

Figure 2C:
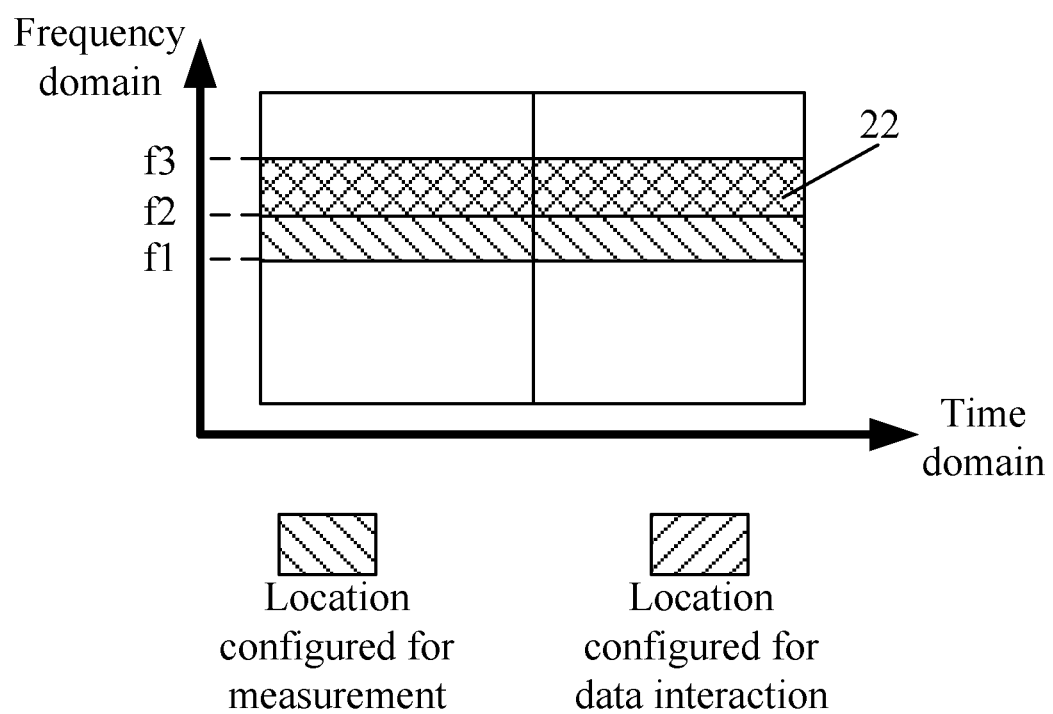
FIG. 2C is a schematic diagram in frequency-time domain of two frequency domain resource locations with an inclusion relation and being specified by the base station according to the embodiment 1 of the present disclosure.

FIG. 2C is a schematic diagram in frequency-time domain of two frequency domain resource locations with an inclusion relation and being specified by the base station. The base station specifies the frequency domain resource [f1, f3] to be configured for the measurement and the frequency domain resource [f2, f3] to be configured for the data interaction in the transmitted available resource information. After the user terminal receives the available resource information, the user terminal performs the measurement using the frequency domain resource [f1, f3] and performs the data interaction using the frequency domain resource [f2, f3] in the subsequent communication process. The frequency domain resource configured for the measurement totally includes the frequency domain resource configured for the data interaction 22 (the frequency domain resource 22 corresponds to [f2, f3]) which may be configured for performing the measurement and the data interaction alternately or simultaneously. The included frequency domain resource 22 may be configured in a manner of being scheduled by the base station in the practical application process.

Figure 2D:
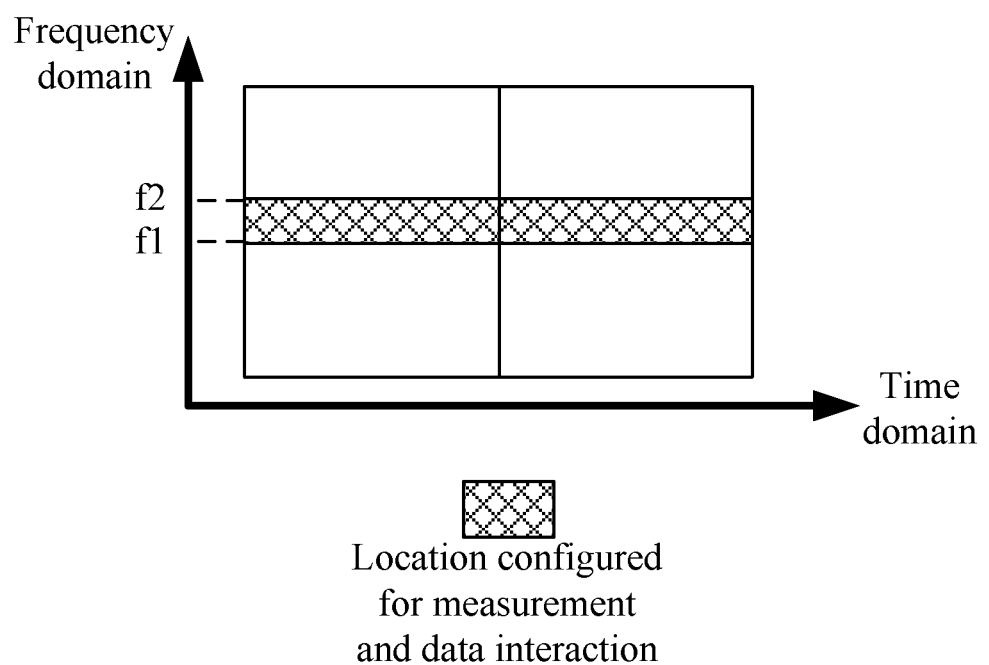
FIG. 2D is a schematic diagram in frequency-time domain of one frequency domain resource location specified by the base station according to the embodiment 1 of the present disclosure.

FIG. 2D is a schematic diagram in frequency-time domains of one frequency domain resource location specified by the base station. The base station specifies the frequency domain resource [f1, f2] to be configured for the measurement and the data interaction in the transmitted available resource information. After the user terminal receives the available resource information, the user terminal performs the measurement and the data interaction alternately or simultaneously using the frequency domain resource [f1, f2] in the subsequent communication process.

Embodiments of the present disclosure provide a method for information transmission which guarantees the forward compatibility by reserving a frequency domain resource. In fact, by adopting a similar technical means, a method for information transmission may be provided which guarantees the forward compatibility by reserving a time domain resource.

Accordingly, the base station may notify the user terminal within the service range of a blank subframe location via the radio resource control signaling, the media access control layer signaling or the physical layer signaling. It should be noted that if a plurality of user terminals are located within the service range of the base station, the plurality of user terminals may be notified of the same blank subframe position or different blank subframe positions. A notification method may include a notification of a blank subframe period or an offset value from some time point, or a direct notification of the blank subframe location. The user terminal does not perform any measurement or data interaction on the blank subframe position, and the user terminal only performs the measurement or the data interaction on a non-blank subframe. Alternatively, the blank subframe location may be predefined, and the user terminal does not need to be notified via the signaling from the base station to obtain the blank subframe location.

In addition, the base station may notify the served user terminal of a serving subframe location via the radio resource control signaling, the media access control layer signaling or the physical layer signaling. The serving subframe is configured for indicating that the user terminal performs the measurement and the data interaction on the serving subframe. Similarly, if a plurality of user terminals are located within the service range of the base station, the plurality of user terminals may be notified of the same serving subframe position or different serving subframe positions. The terminal only performs the measurement and the data interaction on the notified serving subframe position and does not perform any measurement or data interaction on other locations. It is to be noted that the subframe position configured for the measurement and the subframe position configured for the data interaction included in the notified subframe position may be the same or different.

The concept of the subframe in the present application is merely an example and represents a time unit. A definition of a new time unit may appear in a new generation of wireless communication systems and be applicable to the methods in the embodiments of the present disclosure.

Figure 3A:
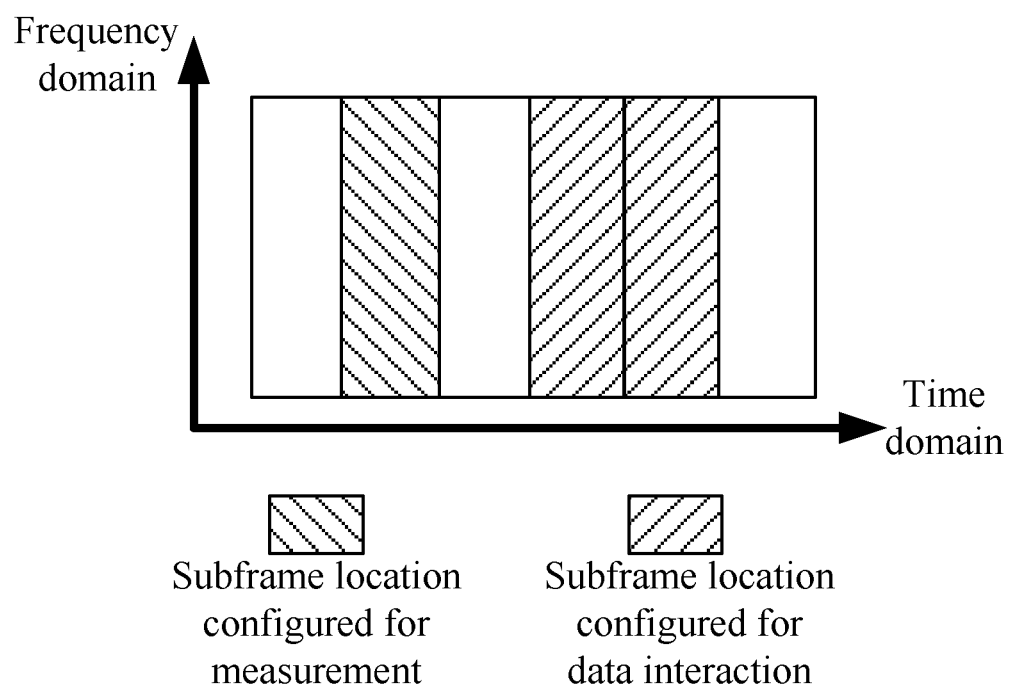
FIG. 3A is a schematic diagram in frequency-time domain of two time domain resource locations specified by the base station according to the embodiment 1 of the present disclosure.
Figure 3B:
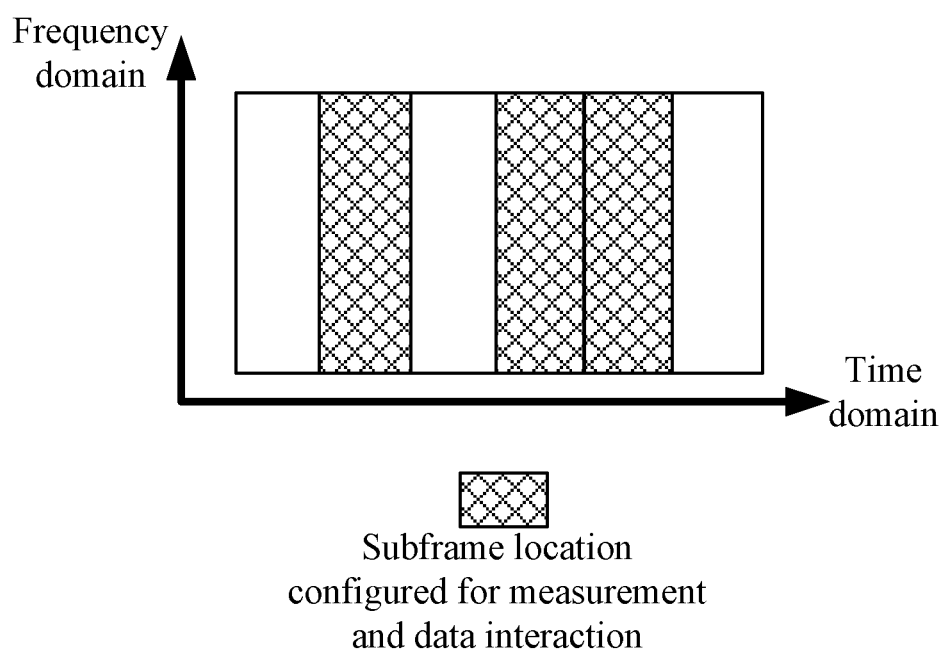
FIG. 3B is a schematic diagram in frequency-time domain of one time domain resource location specified by the base station according to the embodiment 1 of the present disclosure.

FIG. 3A is a schematic diagram in frequency-time domain of two time domain resource locations specified by the base station. FIG. 3B is a schematic diagram in frequency-time domain of one time domain resource location specified by the base station.

Embodiment 2

Figure 4A:
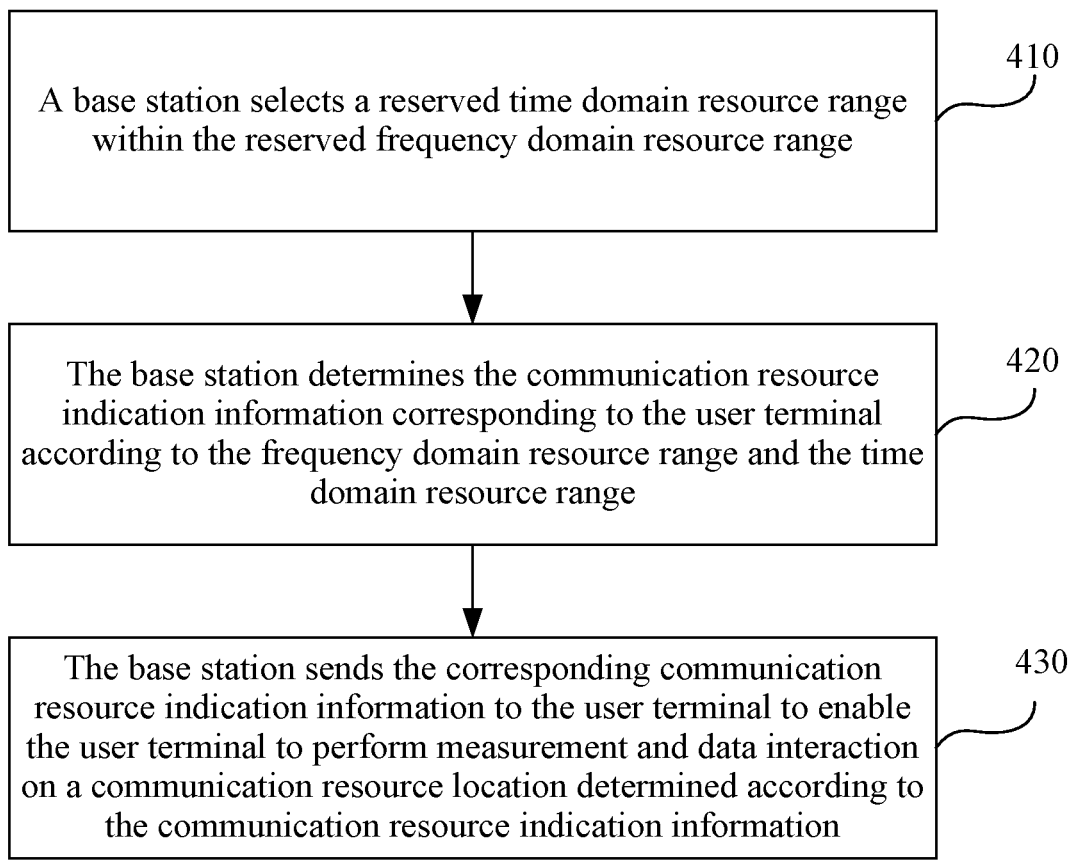
FIG. 4A is a flowchart of a method for information transmission according to an embodiment 2 of the present disclosure.

FIG. 4A is a flowchart of a method for information transmission according to an embodiment 2 of the present disclosure. This embodiment performs an optimization on the basis of the embodiment described above. In this embodiment, the step in which a base station determines communication resource indication information corresponding to a user terminal according to a reserved frequency domain resource range may include that the base station selects a reserved time domain resource range within the reserved frequency domain resource range; and the base station determines the communication resource indication information corresponding to the user terminal according to the frequency domain resource range and the time domain resource range.

Accordingly, the method in this embodiment includes the steps described below.

In 410, the base station selects the reserved time domain resource range within the reserved frequency domain resource range.

In this embodiment, after the base station determines the reserved frequency domain resource range, the base station optionally determines the reserved time domain resource range within the frequency domain resource range.

In an example, the base station determines the reserved frequency resource range to be [f1, f2] and selects a blank subframe position or a serving subframe position within the range [f1, f2] to indicate that the user terminal does not perform measurement or data interaction on one or more blank subframes within the range [f1, f2], or performs measurement and a data exchange only on one or more serving subframes within the range [f1, f2].

In step 420, the base station determines the communication resource indication information corresponding to the user terminal according to the frequency domain resource range and the time domain resource range.

As described above, the communication resource indication information may include reserved resource information and available resource information. Optionally, because the communication resource indication information includes an indication for both a frequency domain resource and a time domain resource, the communication resource indication information may include frequency domain resource indication information, time domain resource indication information and a pilot pattern for the measurement.

The frequency domain resource indication information may include a frequency domain resource size, a position of a starting frequency and a position of an ending frequency.

The time domain resource indication information may include a location of a time domain resource in a set time structure, a time domain resource period and an offset of a starting point of the time domain resource from a set time node.

It should be understood by those skilled in the art that the frequency domain resource indication information and the time domain resource indication information may further include another type of resource indication information capable of uniquely identifying a frequency domain or time domain resource location, which is not limited in this embodiment.

In 430, the base station sends the corresponding communication resource indication information to the user terminal to enable the user terminal to perform the measurement and the data interaction on a communication resource location determined according to the communication resource indication information. The communication resource location is not within the reserved frequency domain resource range.

Figure 4B:
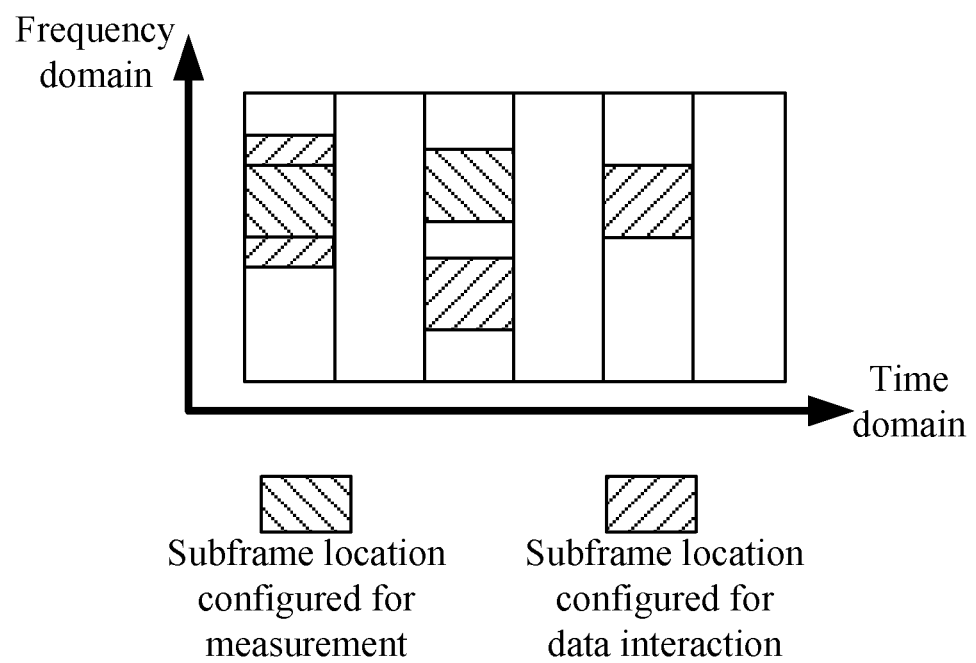
FIG. 4B is a schematic diagram in frequency-time domain of a time domain resource location and a frequency domain resource location simultaneously specified by a base station according to the embodiment 2 of the present disclosure.

FIG. 4B is a schematic diagram in frequency-time domains of a time domain resource location and a frequency domain resource location simultaneously specified by the base station. As shown in FIG. 4B, the available resource information for two resource locations is specified by the base station to be configured for the measurement and the data interaction separately.

The technical solution in this embodiment enriches a resource reservation manner, improves the flexibility of the resource reservation manner, and further adapts to various resource reservation requirements to guarantee forward compatibility in a technical means that the base station selects the reserved time domain resource range within the reserved frequency domain resource range and determines the communication resource indication information corresponding to the user terminal according to the frequency domain resource range and the time domain resource range.

Embodiment 3

Figure 5:
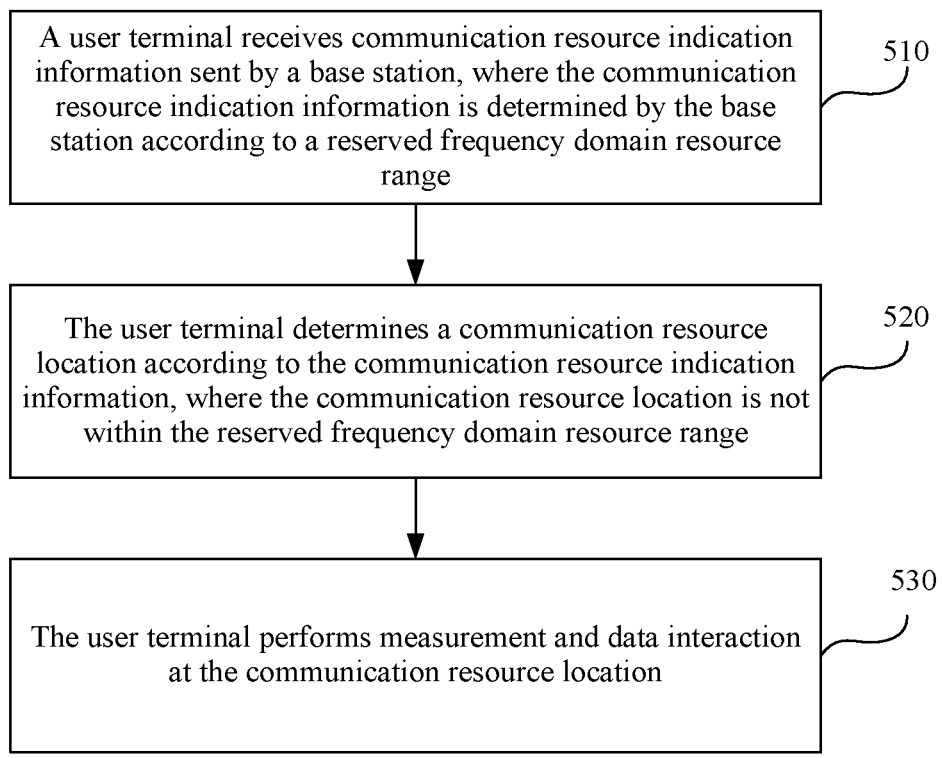
FIG. 5 is a flowchart of a method for information transmission according to an embodiment 3 of the present disclosure.

FIG. 5 is a flowchart of a method for information transmission according to an embodiment 3 of the present disclosure. The method in this embodiment may be executed by a device for information transmission. The device may be implemented by hardware and/or software and generally integrated in a user terminal for working together with a base station. A technical solution in this embodiment corresponds to a method for information transmission based on the base station in the embodiments 1 and 2. The method in this embodiment includes the steps described below.

In 510, a user terminal receives communication resource indication information sent by a base station, where the communication resource indication information is determined by the base station according to a reserved frequency domain resource range, and the user terminal is located within a service range of the base station.

Optionally, the step in which the user terminal receives the communication resource indication information sent by the base station may include at least one of the steps described below.

The user terminal receives the communication resource indication information sent by the base station via radio resource control signaling.

The user terminal receives the communication resource indication information sent by the base station via media access control layer signaling.

The user terminal receives the communication resource indication information sent by the base station via physical layer signaling.

Optionally, the base station may select a reserved time domain resource range within the reserved frequency domain resource range and the communication resource indication information may be determined by the base station according to the frequency domain resource range and the time domain resource range.

Optionally, the communication resource indication information received by the user terminal may be the same as or different from the communication resource indication information received by another user terminal within the service range of the base station.

In 520, the user terminal determines a communication resource location according to the communication resource indication information, where the communication resource location is not within the reserved frequency domain resource range.

Typically, the communication resource indication information may include reserved resource information or available resource information.

The reserved resource information is configured for indicating that the user terminal performs measurement and data interaction at the communication resource location excluding the reserved resource information.

The available resource information is configured for indicating that the user terminal performs the measurement and the data interaction at the communication resource location corresponding to the available resource information.

Optionally, the available resource information may include: available resource information for two resource locations configured for performing the measurement and the data interaction separately; or available resource information for one resource location configured for performing the measurement and the data interaction alternately or simultaneously.

The available resource information for two resource locations includes: available resource information for two resource locations with no overlap, available resource information for two resource locations with a partial overlap or available resource information for two resource locations with an inclusion relation.

Optionally, the communication resource indication information may include frequency domain resource indication information, time domain resource indication information and a pilot pattern for the measurement.

The frequency domain resource indication information includes a frequency domain resource size, a position of a starting frequency and a position of an ending frequency.

The time domain resource indication information includes a location of a time domain resource in a set time structure, a time domain resource period and an offset of a starting point of the time domain resource from a set time node.

In 530, the user terminal performs the measurement and the data interaction at the communication resource location.

In the embodiments of the present disclosure, the user terminal receives the communication resource indication information sent by the base station, determines the communication resource location according to the communication resource indication information, and performs the measurement and the data interaction at the communication resource location. In this way, the user terminal may perform the measurement and the data interaction on the resource location that is not within the frequency domain resource range reserved by the base station, a purpose of reserving a set frequency domain resource is achieved and a new function may be further introduced in the reserved frequency domain resource, thereby effectively ensuring design requirements of forward compatibility, overcoming a limitation of an existing system design for the forward compatibility in the time dimension, and satisfying increasing personalized and convenient design requirements of the forward compatibility.

Embodiment 4

Figure 6:
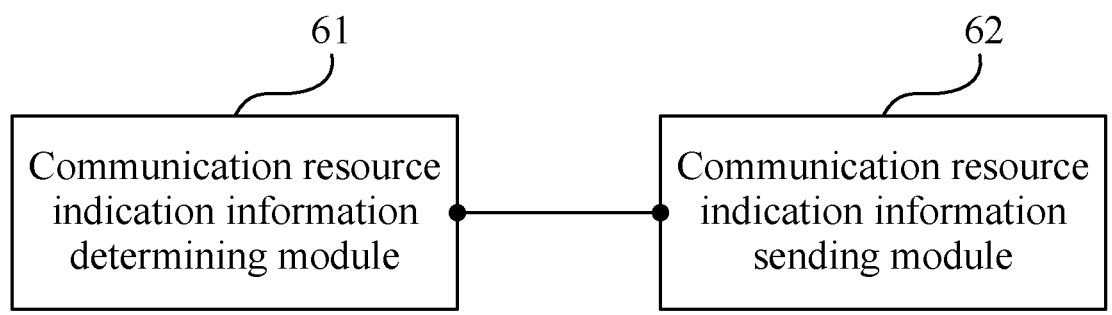
FIG. 6 is a block diagram of a device for information transmission according to an embodiment 4 of the present disclosure.

FIG. 6 is a block diagram of a device for information transmission according to an embodiment 4 of the present disclosure. The device is disposed in a base station. As shown in FIG. 6, the device includes a communication resource indication information determining module 61 and a communication resource indication information sending module 62.

The communication resource indication information determining module 61 is configured to determine communication resource indication information corresponding to a user terminal according to a reserved frequency domain resource range, where the user terminal is located within a service range of the base station.

The communication resource indication information sending module 62 is configured to send the corresponding communication resource indication information to the user terminal to enable the user terminal to perform measurement and data interaction on a communication resource location determined according to the communication resource indication information; where the communication resource location is not within the reserved frequency domain resource range.

In the embodiments of the present disclosure, the base station determines the communication resource indication information corresponding to the user terminal according to the reserved frequency domain resource range and sends the corresponding communication resource indication information to the user terminal so that the user terminal performs the measurement and the data interaction on the resource location that is not within the frequency domain resource range reserved by the base station. In this way, a purpose of reserving a set frequency domain resource is achieved and a new function may be further introduced in the reserved frequency domain resource, thereby effectively ensuring design requirements of forward compatibility, overcoming a limitation of an existing system design for the forward compatibility in the time dimension, and satisfying increasing personalized and convenient design requirements of the forward compatibility.

On the basis of the embodiments described above, the communication resource indication information determining module may be configured to execute the steps described below.

A reserved time domain resource range is selected within the reserved frequency domain resource range.

The communication resource indication information corresponding to the user terminal is determined according to the frequency domain resource range and the time domain resource range.

On the basis of the embodiments described above, the communication resource indication information may include reserved resource information or available resource information.

The reserved resource information is configured for indicating that the user terminal performs the measurement and the data interaction at the communication resource location excluding the reserved resource information.

The available resource information is configured for indicating that the user terminal performs the measurement and the data interaction at the communication resource location corresponding to the available resource information.

On the basis of the embodiments described above, if at least two user terminals are located within the service range of the base station, the communication resource indication information corresponding to the at least two user terminals determined by the base station may be the same or different.

On the basis of the embodiments described above, the communication resource indication information sending module may include at least one of the following information sending units.

A first information sending unit is configured to send the corresponding communication resource indication information to the user terminal via radio resource control signaling.

A second information sending unit is configured to send the corresponding communication resource indication information to the user terminal via media access control layer signaling.

A third information sending unit is configured to send the corresponding communication resource indication information to the user terminal via physical layer signaling.

On the basis of the embodiments described above, the available resource information may include: available resource information for two resource locations configured for performing the measurement and the data interaction separately; or available resource information for one resource location configured for performing the measurement and the data interaction alternately or simultaneously.

The available resource information for two resource locations includes: available resource information for two resource locations with no overlap, available resource information for two resource locations with a partial overlap or available resource information for two resource locations with an inclusion relation.

On the basis of the embodiments described above, the communication resource indication information may include frequency domain resource indication information, time domain resource indication information and a pilot pattern for the measurement.

The frequency domain resource indication information includes a frequency domain resource size, a position of a starting frequency and a position of an ending frequency.

The time domain resource indication information includes a location of a time domain resource in a set time structure, a time domain resource period and an offset of a starting point of the time domain resource from a set time node.

The device for information transmission according to the embodiments of the present disclosure may be configured for executing the method for information transmission according to the embodiments 1 and 2 of the present disclosure. The device has corresponding functional modules and achieves the same beneficial results.

Embodiment 5

Figure 7:
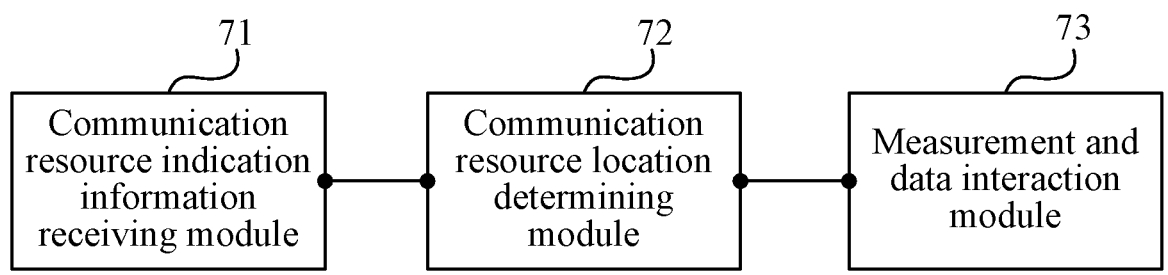
FIG. 7 is a block diagram of a device for information transmission according to an embodiment 5 of the present disclosure.

FIG. 7 is a block diagram of a device for information transmission according to an embodiment 5 of the present disclosure. The device is disposed in a user terminal. As shown in FIG. 7, the device includes a communication resource indication information receiving module 71, a communication resource location determining module 72 and a measurement and data interaction module 73.

The communication resource indication information receiving module 71 is configured to receive communication resource indication information sent by a base station, where the communication resource indication information is determined by the base station according to a reserved frequency domain resource range, and the user terminal is located within a service range of the base station.

The communication resource location determining module 72 is configured to determine a communication resource location according to the communication resource indication information, where the communication resource location is not within the reserved frequency domain resource range.

The measurement and data interaction module 73 is configured to perform measurement and data interaction at the communication resource location.

In the embodiments of the present disclosure, the user terminal receives the communication resource indication information sent by the base station, determines the communication resource location according to the communication resource indication information, and performs the measurement and the data interaction at the communication resource location. In this way, the user terminal may perform the measurement and the data interaction on the resource location that is not within the frequency domain resource range reserved by the base station, a purpose of reserving a set frequency domain resource is achieved and a new function may be further introduced in the reserved frequency domain resource, thereby effectively ensuring design requirements of forward compatibility, overcoming a limitation of an existing system design for the forward compatibility in the time dimension, and satisfying increasing personalized and convenient design requirements of the forward compatibility.

On the basis of the embodiments described above, the base station may select a reserved time domain resource range within the reserved frequency domain resource range and the communication resource indication information may be determined by the base station according to the frequency domain resource range and the time domain resource range.

On the basis of the embodiments described above, the communication resource indication information may include reserved resource information or available resource information.

The reserved resource information is configured for indicating that the user terminal performs the measurement and the data interaction at the communication resource location excluding the reserved resource information.

The available resource information is configured for indicating that the user terminal performs the measurement and the data interaction at the communication resource location corresponding to the available resource information.

On the basis of the embodiments described above, the communication resource indication information received by the user terminal may be the same as or different from the communication resource indication information received by another user terminal within the service range of the base station.

On the basis of the embodiments described above, the communication resource indication information receiving module may include at least one of the following information receiving units.

A first information receiving unit is configured to receive the communication resource indication information sent by the base station via radio resource control signaling.

A second information receiving unit is configured to receive the communication resource indication information sent by the base station via media access control layer signaling.

A third information receiving unit is configured to receive the communication resource indication information sent by the base station via physical layer signaling.

On the basis of the embodiments described above, the available resource information may include: available resource information for two resource locations configured for performing the measurement and the data interaction separately; or available resource information for one resource location configured for performing the measurement and the data interaction alternately or simultaneously.

The available resource information for two resource locations includes: available resource information for two resource locations with no overlap, available resource information for two resource locations with a partial overlap or available resource information for two resource locations with an inclusion relation.

On the basis of the embodiments described above, the communication resource indication information may include frequency domain resource indication information, time domain resource indication information and a pilot pattern for the measurement.

The frequency domain resource indication information includes a frequency domain resource size, a position of a starting frequency and a position of an ending frequency.

The time domain resource indication information includes a location of a time domain resource in a set time structure, a time domain resource period and an offset of a starting point of the time domain resource from a set time node.

The device for information transmission according to the embodiments of the present disclosure may be configured for executing the method for information transmission according to the embodiment 3 of the present disclosure. The device has corresponding functional modules and achieves the same beneficial results.

Embodiment 6

An embodiment 6 of the present disclosure further provides a non-transient computer-readable storage medium storing computer-executable instructions for executing the method for information transmission in the embodiment 1 or 2.

Embodiment 7

An embodiment 7 of the present disclosure further provides a non-transient computer-readable storage medium storing computer-executable instructions for executing the method for information transmission in the embodiment 3.

Embodiment 8

An embodiment 8 of the present disclosure further provides a structural diagram of hardware of a user terminal.

Figure 8:
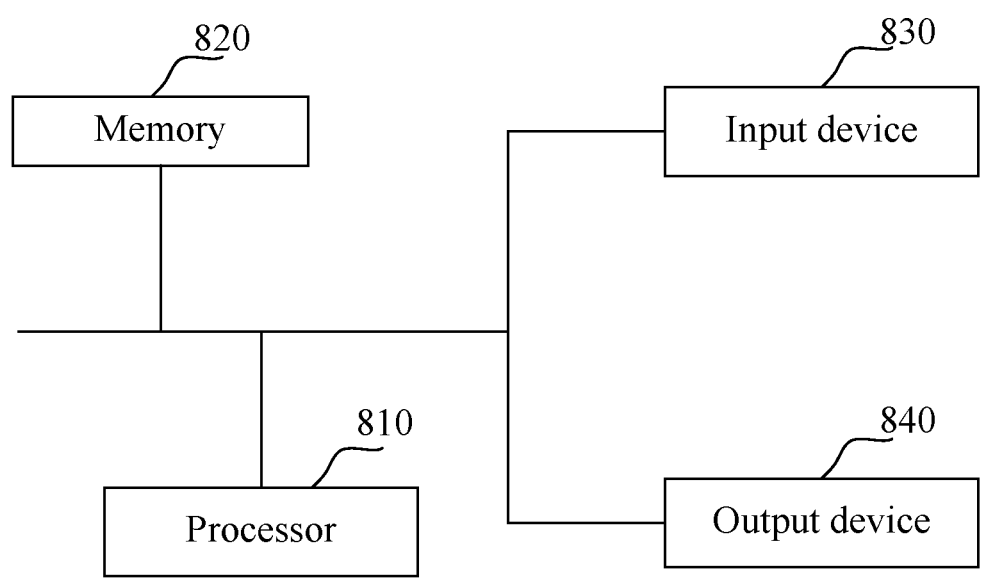
FIG. 8 is a structural diagram of hardware of a user terminal according to an embodiment 6 of the present disclosure.

As shown in FIG. 8, the user terminal includes:
one or more processors 810 (one processor 810 is configured as an example in FIG. 8); and
a memory 820.

The user terminal may further include an input device 830 and an output device 840.

The processor 810, the memory 820, the input device 830 and the output device 840 in the user terminal may be connected via a bus or other means, with connection via a bus as an example in FIG. 8.

The memory 820, as a non-transient computer-readable storage medium, may be configured for storing software programs and computer executable programs and modules such as program instructions/modules corresponding to the user terminal in the embodiment 5 of the present disclosure (for example, a communication resource indication information receiving module, a communication resource location determining module and a measurement and data interaction module). The processor 810 runs the software programs, instructions and modules stored in the memory 820 to execute function applications and data processing of the user terminal, that is, to implement the method for information transmission in the method embodiments described above.

The memory 820 may include a program storage region and a data storage region, where the program storage region may store an operating system and an application program required by at least one function while the data storage region may store data created according to use of a terminal equipment. Furthermore, the memory 820 may include a high-speed random access memory, and may further include a non-transient memory such as at least one disk memory, flash memory or another nonvolatile solid state memory. In some embodiments, the memory 820 optionally includes memories which are remotely disposed relative to the processor 810 and these remote memories may be connected to the terminal equipment via a network. Examples of such a network include, but are not limited to, the Internet, intranets, local area networks, mobile communication networks, and combinations thereof.

The input device 830 may be configured for receiving inputted digital or character information and for generating key signal input related to user settings and function control of the terminal. The output device 840 may include a display screen and another display equipment.

When executed by the one or more processors 810, the one or more modules, which are stored in the memory 820, execute the method for information transmission provided for the user terminal in the method embodiments described above.

Embodiment 9

An embodiment 9 of the present disclosure further provides a structural diagram of hardware of a base station.

Figure 9:
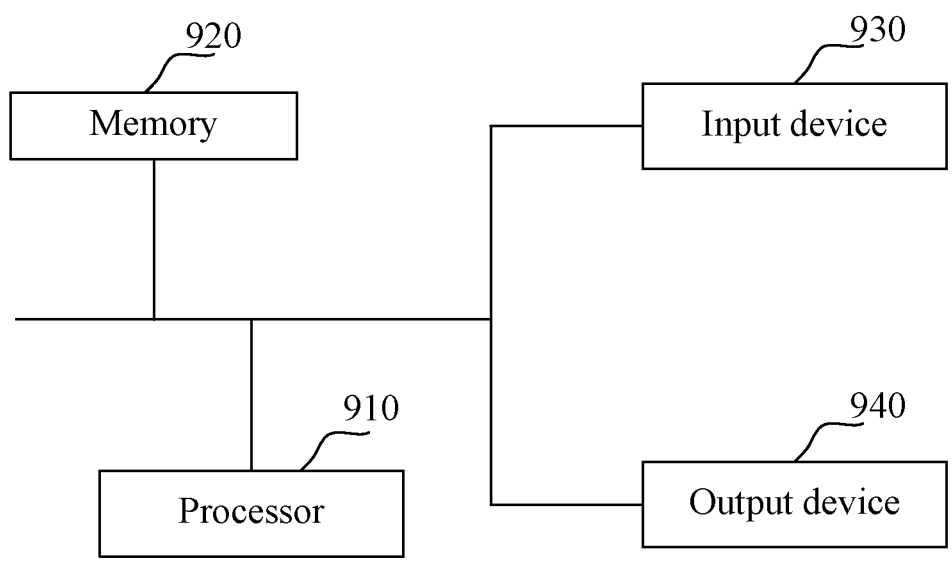
FIG. 9 is a structural diagram of hardware of a base station according to an embodiment 7 of the present disclosure.

As shown in FIG. 9, the base station includes: one or more processors 910 (one processor 910 is configured as an example in FIG. 9) and a memory 920.

The base station may further include an input device 930 and an output device 940.

The processor 910, the memory 920, the input device 930 and the output device 940 in the base station may be connected via a bus or other means, with connection via a bus as an example in FIG. 9.

The memory 920, as a non-transient computer-readable storage medium, may be configured for storing software programs and computer executable programs and modules such as program instructions/modules corresponding to the base station in the embodiment 4 of the present disclosure (for example, a communication resource indication information determining module and a communication resource indication information sending module). The processor 910 runs the software programs, instructions and modules stored in the memory 920 to execute function applications and data processing of the base station, that is, to implement the method for information transmission in the method embodiments described above.

The memory 920 may include a program storage region and a data storage region, where the program storage region may store an operating system and an application program required by at least one function while the data storage region may store data created according to use of a terminal equipment. Furthermore, the memory 920 may include a high-speed random access memory, and may further include a non-transient memory such as at least one disk memory, flash memory or another nonvolatile solid state memory. In some embodiments, the memory 920 optionally includes memories which are remotely disposed relative to the processor 910 and these remote memories may be connected to the terminal equipment via a network. Examples of such a network include, but are not limited to, the Internet, intranets, local area networks, mobile communication networks, and combinations thereof.

The input device 930 may be configured for receiving inputted digital or character information and for generating key signal input related to user settings and function control of the terminal. The output device 940 may include a display screen and another display equipment.

When executed by the one or more processors 910, the one or more modules, which are stored in the memory 920, execute the method for information transmission provided for the base station in the method embodiments described above.

The technical solutions of the present disclosure are described above in conjunction with the drawings. The technical solutions for information processing provided by the present disclosure may enable the user terminal to perform the measurement and the data interaction on the resource location that is not within the frequency domain resource range reserved by the base station, achieve a purpose of reserving a set frequency domain resource, and further introduce a new function in the reserved frequency domain resource, thereby effectively ensuring design requirements of the forward compatibility, overcoming the limitation of the existing system design for the forward compatibility in the time dimension, and satisfying increasing personalized and convenient design requirements of the forward compatibility.

The above are only some embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:
1. A method for information transmission, comprising:
   determining, by a base station, communication resource indication information corresponding to a user terminal according to a reserved frequency domain resource range, wherein the user terminal is located within a service range of the base station; and
   sending, by the base station, the corresponding communication resource indication information to the user terminal to enable the user terminal to perform measurement and data interaction at a communication resource location determined according to the communication resource indication information;
wherein the communication resource location is not within the reserved frequency domain resource range.

2. The method of claim 1, wherein the determining, by the base station, the communication resource indication information corresponding to the user terminal according to the reserved frequency domain resource range comprises:
selecting a reserved time domain resource range within the reserved frequency domain resource range by the base station; and
determining, by the base station, the communication resource indication information corresponding to the user terminal according to the frequency domain resource range and the time domain resource range.

3. The method of claim 1, wherein the communication resource indication information comprises: reserved resource information or available resource information;
wherein the reserved resource information is configured for indicating that the user terminal performs the measurement and the data interaction at the communication resource location excluding the reserved resource information; and
wherein the available resource information is configured for indicating that the user terminal performs the measurement and the data interaction at the communication resource location corresponding to the available resource information.

4. The method of claim 3, wherein the available resource information comprises:
available resource information for two resource locations configured for performing the measurement and the data interaction separately; or
available resource information for one resource location configured for performing the measurement and the data interaction alternately or simultaneously;
wherein the available resource information for two resource locations comprises:
available resource information for two resource locations with no overlap, available resource information for two resource locations with a partial overlap or available resource information for two resource locations with an inclusion relation.

5. The method of claim 2, wherein the communication resource indication information comprises: frequency domain resource indication information, time domain resource indication information and a pilot pattern for the measurement;
wherein the frequency domain resource indication information comprises: a frequency domain resource size, a position of a starting frequency and a position of an ending frequency; and
wherein the time domain resource indication information comprises: a location of a time domain resource in a set time structure, a time domain resource period and an offset of a starting point of the time domain resource from a set time node.

6. A method for information transmission, comprising:
receiving, by a user terminal, communication resource indication information sent by a base station, wherein the communication resource indication information is determined by the base station according to a reserved frequency domain resource range, and the user terminal is located within a service range of the base station;
determining, by the user terminal, a communication resource location according to the communication resource indication information, wherein the communication resource location is not within the reserved frequency domain resource range; and
performing measurement and data interaction at the communication resource location by the user terminal.

7. The method of claim 6, wherein the communication resource indication information comprises: reserved resource information or available resource information;
wherein the reserved resource information is configured for indicating that the user terminal performs the measurement and the data interaction at the communication resource location excluding the reserved resource information; and
wherein the available resource information is configured for indicating that the user terminal performs the measurement and the data interaction at the communication resource location corresponding to the available resource information.

8. The method of claim 7, wherein the available resource information comprises:
available resource information for two resource locations configured for performing the measurement and the data interaction separately; or
available resource information for one resource location configured for performing the measurement and the data interaction alternately or simultaneously;
wherein the available resource information for two resource locations comprises:
available resource information for two resource locations with no overlap, available resource information for two resource locations with a partial overlap or available resource information for two resource locations with an inclusion relation.

9. The method of claim 6, wherein the communication resource indication information comprises: frequency domain resource indication information, time domain resource indication information and a pilot pattern for the measurement;
wherein the frequency domain resource indication information comprises: a frequency domain resource size, a position of a starting frequency and a position of an ending frequency; and
wherein the time domain resource indication information comprises: a location of a time domain resource in a set time structure, a time domain resource period and an offset of a starting point of the time domain resource from a set time node.

10. A base station, comprising:
at least one processor; and
a memory communicably connected with the at least one processor, wherein the memory is configured for storing instructions executable by the at least one processor, wherein the instructions when executed by the at least one processor causes the at least one processor to perform:
determining, by the base station, communication resource indication information corresponding to a user terminal according to a reserved frequency domain resource range, wherein the user terminal is located within a service range of the base station; and
sending, by the base station, the corresponding communication resource indication information to the user terminal to enable the user terminal to perform measurement and data interaction at a communication resource location determined according to the communication resource indication information;
wherein the communication resource location is not within the reserved frequency domain resource range.

11. The base station of claim 10, wherein the determining, by the base station, the communication resource indication information corresponding to the user terminal according to the reserved frequency domain resource range comprises:
   selecting a reserved time domain resource range within the reserved frequency domain resource range by the base station; and
   determining, by the base station, the communication resource indication information corresponding to the user terminal according to the frequency domain resource range and the time domain resource range.

12. The base station of claim 10, wherein the communication resource indication information comprises: reserved resource information or available resource information;
   wherein the reserved resource information is configured for indicating that the user terminal performs the measurement and the data interaction at the communication resource location excluding the reserved resource information; and
   wherein the available resource information is configured for indicating that the user terminal performs the measurement and the data interaction at the communication resource location corresponding to the available resource information.

13. The base station of claim 12, wherein the available resource information comprises:
   available resource information for two resource locations configured for performing the measurement and the data interaction separately; or
   available resource information for one resource location configured for performing the measurement and the data interaction alternately or simultaneously;
   wherein the available resource information for two resource locations comprises:
   available resource information for two resource locations with no overlap, available resource information for two resource locations with a partial overlap or available resource information for two resource locations with an inclusion relation.

14. The base station of claim 11, wherein the communication resource indication information comprises: frequency domain resource indication information, time domain resource indication information and a pilot pattern for the measurement;
   wherein the frequency domain resource indication information comprises: a frequency domain resource size, a position of a starting frequency and a position of an ending frequency; and
   wherein the time domain resource indication information comprises: a location of a time domain resource in a set time structure, a time domain resource period and an offset of a starting point of the time domain resource from a set time node.

15. An user terminal, comprising:
   at least one processor; and
   a memory communicably connected with the at least one processor, wherein the memory is configured for storing instructions executable by the at least one processor, wherein the instructions when executed by the at least one processor causes the at least one processor to perform the method for information transmission according to claim 6.

16. A non-transitory computer-readable storage medium storing computer-executable instruction for performing the method for information transmission according to claim 1.

17. A non-transitory computer-readable storage medium storing computer-executable instruction for performing the method for information transmission according to claim 6.

18. The method of claim 2, wherein the communication resource indication information comprises: reserved resource information or available resource information;
   wherein the reserved resource information is configured for indicating that the user terminal performs the measurement and the data interaction at the communication resource location excluding the reserved resource information; and
   wherein the available resource information is configured for indicating that the user terminal performs the measurement and the data interaction at the communication resource location corresponding to the available resource information.

19. The method of claim 18, wherein the available resource information comprises:
   available resource information for two resource locations configured for performing the measurement and the data interaction separately; or
   available resource information for one resource location configured for performing the measurement and the data interaction alternately or simultaneously;
   wherein the available resource information for two resource locations comprises:
   available resource information for two resource locations with no overlap, available resource information for two resource locations with a partial overlap or available resource information for two resource locations with an inclusion relation.

20. The base station of claim 11, wherein the communication resource indication information comprises: reserved resource information or available resource information;
   wherein the reserved resource information is configured for indicating that the user terminal performs the measurement and the data interaction at the communication resource location excluding the reserved resource information; and
   wherein the available resource information is configured for indicating that the user terminal performs the measurement and the data interaction at the communication resource location corresponding to the available resource information.

* * * * *